United States Patent
Oami et al.

(10) Patent No.: US 7,220,471 B1
(45) Date of Patent: May 22, 2007

(54) INSERT FILM USED FOR FORMING RESIN PANEL, PROCESS FOR PRODUCING THE FILM AND RESIN PANEL USING THE FILM

(75) Inventors: Kotaro Oami, Aichi-ken (JP); Masaaki Suzumura, Aichi-ken (JP)

(73) Assignee: Kabushiki Kaisha Toyoda Jidoshokki Seisakusho, Kariya-shi (JP)

( * ) Notice: Subject to any disclaimer, the term of this patent is extended or adjusted under 35 U.S.C. 154(b) by 0 days.

(21) Appl. No.: 09/626,811

(22) Filed: Jul. 27, 2000

(30) Foreign Application Priority Data

Jul. 29, 1999 (JP) .................................. 11-215541

(51) Int. Cl.
*B44C 5/08* (2006.01)

(52) U.S. Cl. ................ 428/38; 428/412; 428/178; 428/73; 428/339; 428/203; 428/195; 428/14; 428/68; 283/109; 283/110; 283/112

(58) Field of Classification Search ............... 428/412, 428/178, 73, 339, 203, 195, 14, 68, 76, 38; 40/1.3; 283/109, 110, 112
See application file for complete search history.

(56) References Cited

U.S. PATENT DOCUMENTS

| | | | |
|---|---|---|---|
| 4,101,701 A | * | 7/1978 | Gordon .................... 428/189 |
| 4,816,362 A | * | 3/1989 | Takeda et al. .............. 283/904 |
| 5,362,540 A | * | 11/1994 | Keng .......................... 428/13 |
| 6,103,999 A | * | 8/2000 | Nishio et al. ............... 219/203 |
| 6,185,812 B1 | * | 2/2001 | Castle et al. .................. 29/611 |

FOREIGN PATENT DOCUMENTS

| | | |
|---|---|---|
| JP | 6-270188 | 9/1994 |
| JP | 6-297498 | 11/1994 |
| JP | 7-308396 | 11/1995 |
| JP | 07308936 A * | 11/1995 |

\* cited by examiner

*Primary Examiner*—Patrick Joseph Ryan
*Assistant Examiner*—Jane Rhee
(74) *Attorney, Agent, or Firm*—Morgan & Finnegan, L.L.P.

(57) ABSTRACT

An insert film having a printed part is integrally molded to a surface of a panel body made of a resin by an insert molding. The printed part is printed on a first binder layer applied to a resin film and also is formed on the resin film in a state such of being sealed with the first binder layer and a second binder layer applied on the printed part. The printed part is formed as a trimming portion (blackout) along a peripheral portion of the resin film, and an area is formed between the peripheries of the first binder layer and the second binder layer and the periphery of the resin film.

9 Claims, 3 Drawing Sheets

INSERT FILM USED FOR FORMING RESIN PANEL, PROCESS FOR PRODUCING THE FILM AND RESIN PANEL USING THE FILM

BACKGROUND OF THE INVENTION

1. Field of the Invention

The present invention relates to an insert film used for forming a resin panel, a process for producing the insert film and a resin panel using the insert film. More particularly, it relates to an insert film having provided therein a printed part.

2. Description of the Related Art

Conventionally, glass is used as a material for a window member of automobiles. However, glass has high specific gravity. Therefore, to attempt making the window material lightweight, a resin window using a resin such as polycarbonates or acrylic resins as a material thereof in place of glass is also used. For example, Japanese Patent Application Laid-Open No. 6-170883 discloses that, because a resin window has a softer surface as compared with a glass window, insert molding is conducted for integral molding by injecting a molten resin in a mold in a state such that a resin (polycarbonate) film or sheet in which one side has been subjected to a hard coat treatment is arranged in an injection molding mold with the hard coat side facing a mold wall, thereby a resin window having a hard coat layer formed on at least one side thereof.

Further, an opaque trimming part (blackout) for playing a role of hiding a mounting portion of a body panel or a printed part for forming a sunshade or the like is sometimes arranged on a resin window. FIG. 6 is a perspective view of a resin window 32 provided with a trimming part as a printed part 31, and FIG. 7 is a partially sectional view thereof. As shown in FIG. 7, the printed part 31 is formed in a state so that it is sealed with a molding resin portion 33 and a resin film or sheet 34 (hereinafter referred to as "resin film 34" for simplicity). In FIG. 6, the printed part 31 is actually in a state that the entire part is completely coated with an ink of dark color, such as black.

In the case of producing such a resin window 32, the resin film 34 in which the printed part 31 is formed by an ink on the side opposite the side to which a hard coat treatment has been applied, is arranged in a fixed mold such that the printed part 31 faces a movable mold. After the movable mold is moved to close the mold, a molten resin is injected into the mold from a gate, thereby integrally molding with the resin film 34.

However, the ink has poor adhesiveness with a polycarbonate, which is a material of the resin film 34. Moreover, in order to attempt to not leave molding trace on an exposed surface of the resin window, if a gate for injecting a molten resin in a cavity of the mold is arranged at one edge side, the printed part 31 at the side near the gate receives great shear force from a molten resin of high temperature and high pressure. As a result, there is the possibility that the surface of the printed part 31 is shaved off and flows away, or a part of the printed part 31 lifts from the resin film 34 and moves, and an ink flow 35 occurs as shown in FIG. 8 resulting in a defective product.

Further, there are the same problems, not limited to just the resin window, in the case where the desired pattern is formed on the surface of a resin panel by integrally molding an insert film or sheet having a printed part on the surface of a molten injection molded resin.

Japanese Patent Application Laid-Open No. 6-270188 discloses a method of solving this problem. That is, in a process for producing a molded product having a pattern thereon, by mounting a sheet having a character or pattern formed thereon on at least one side of a mold cavity such that the character- or pattern-processed surface faces the cavity side, and injecting a thermoplastic resin in the cavity, thereby integrally molding those, pressure and speed of a resin to be injected are controlled to prevent ink flow.

Further, Japanese Patent Application Laid-Open No. 7-308936 discloses that in producing a molded product having a pattern thereon by mounting a resin sheet or film (insert film) having formed thereon a pattern by a printing ink in a mold and injecting a molten thermoplastic resin in the mold, thereby integrally molding those, the sheet or film that the pattern formed by a printing ink is further coated with a saturated thermoplastic polyester resin is used as the insert film, or a saturated thermoplastic polyester resin is contained in the printing ink.

However, in the case that the ink flow is prevented by controlling pressure and speed of the resin to be injected, as disclosed in Japanese Patent Application Laid-Open No. 6-270188, it is necessary to set proper conditions according to a shape and a size of a resin panel, and also there is the problem that a gate shape or a cavity depth of a mold is restrictive.

Further, adhesive force between a pattern and a molding material injected can be improved by covering a surface of a pattern (printed part) with a saturated thermoplastic polyester resin, or mixing a saturated thermoplastic polyester resin in a ink.

However, even if the surface of a pattern (printed part) is covered with a saturated thermoplastic polyester resin, adhesiveness between the ink and the insert film is poor. As a result, when receiving a large shear force in injecting a molding material, it is difficult to prevent ink flow due to lifting of a part of the printed part. Further, if a saturated thermoplastic polyester resin is contained in an ink, it results in diluting the ink. As a result, light transmission rate is not sufficiently suppressed by such a thickness obtained by a general printing method. On the other hand, if an amount of carbon or pigment in an ink is increased to thicken the ink, there is the problem that inconveniences tend to occur in printing.

SUMMARY OF THE INVENTION

The present invention has been made to overcome the above-described problems.

A first object of the present invention is to provide a resin panel that can prevent an ink flow on a printed part when producing the resin panel or a generation of a gap between a printed part and a film or sheet with the passage of time after use, by a simple structure and at the same time without using a specific printing ink.

A second object of the present invention is to provide an insert film suitable for the production of a resin panel having a printed part therein.

The insert film according to the present invention is an insert film used to form a resin panel having a print that is arranged on a surface of a resin panel body, and comprises a resin film, a first binder layer formed on the surface of the resin film, a printed part formed on the first binder layer, and a second binder layer formed so as to seal the printed part in co-operation with the first binder layer.

A process for producing an insert film according to the present invention, is to produce the insert film described in claim 1. The process comprises a step of forming a first binder layer on a surface of a resin film, a step of forming a printed part on the first binder layer, and a step of forming a second binder layer so as to seal the printed part in co-operation with the first binder layer.

The resin panel according to the present invention comprises the insert film as described in claim 1 and a resin panel body, the resin panel body being integrally molded with the insert film by insert molding in a state such that a surface of the resin film of the insert film at the side on which a printed part is formed faces inside.

DESCRIPTION OF THE PREFERRED EMBODIMENTS

One practical embodiment in which the present invention is embodied in a resin window of automobiles is hereinafter explained according to FIGS. 1 to 4.

Figure 1:
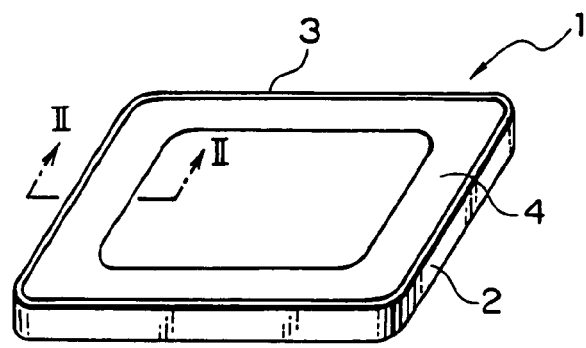
FIG. 1 is a perspective view showing a resin window according to an embodiment of the present invention.
Figure 2:
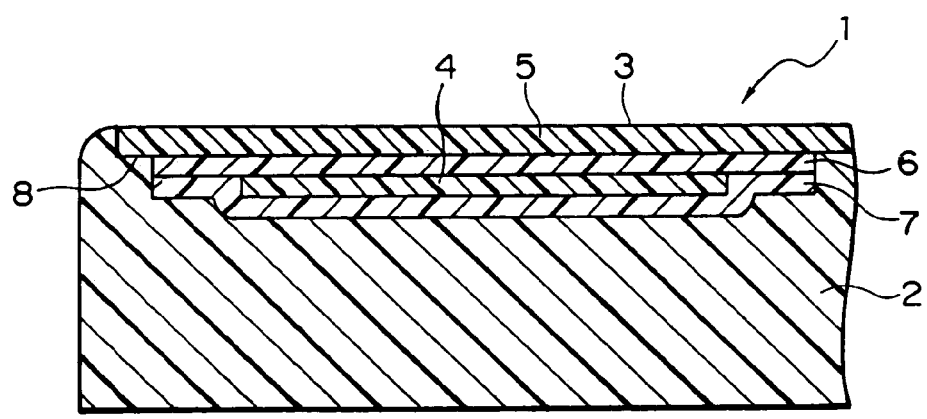
FIG. 2 is an enlarged sectional view taken along the line II—II in FIG. 1.

As shown in FIGS. 1 and 2, a resin window 1 as a resin panel comprises a resin-made panel body 2 and an insert film 3 having the inside thereof a printed part 4 as a trimming part (blackout) formed along a periphery of the insert film 3, the insert film being integrally molded with the surface of the panel body by insert molding. The material of the panel body 2 is polycarbonate. In FIG. 1, the printed part 4 is actually the state that the entire surface thereof is completely coated with an ink of a dark color such as black.

Figure 3:
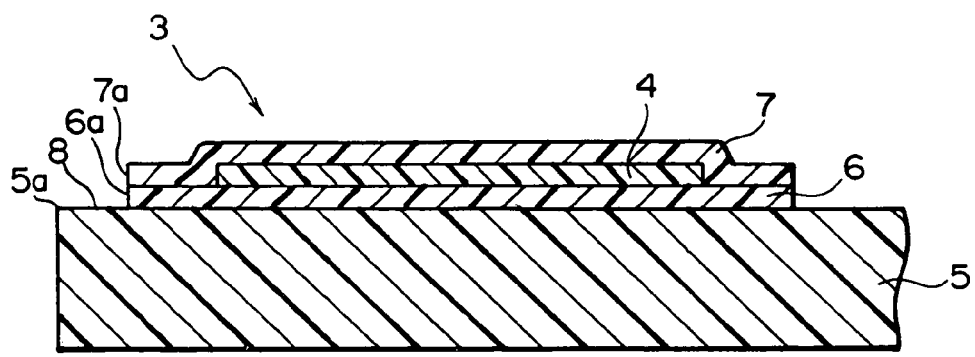
FIG. 3 is a partial sectional view of an insert film in a resin window according to an embodiment of the present invention.

As shown in FIG. 3, the insert film 3 comprises a resin film or sheet 5 (hereinafter referred to as "resin film 5" for simplicity), a first binder layer 6 applied to one side of the resin film 5, the printed part 4 formed on the first binder layer 6, and a second binder layer 7 formed so as to cover the printed part 4. The printed part 4 is sealed with the binder layers 6 and 7. A conventional hard coat treatment is applied to a surface of the resin film 5 opposite the surface on which the printed part 4 is formed.

The first binder layer 6 is formed such that an area thereof is slightly larger than that of the printed part 4. Outer periphery 6a of the first binder layer 6 does not coincide with a periphery 5a of the resin film 5, so that there remains an area 8 where a surface of the resin film 5 is exposed. The second binder layer 7 is formed such that its periphery 7a coincides with the periphery 6a of the first binder layer 6. Each of the binder layers 6 and 7 is set to have a thickness of 2 to 30 μm, and the printed part 4 is set to have a thickness of 2 to 30 μm.

As the resin film 5, for example, a polycarbonate film having a thickness of 0.1 to 1.0 mm is used. The material for each of the binder layers 6 and 7 used is a vinyl chloride-vinyl acetate copolymer. The vinyl chloride-vinyl acetate copolymer is applied in a state of being dissolved in a solvent. Ink for the printed part 4 is one comprising, for example, a polyester resin as a main component, and a dye or pigment having the desired color, dissolved or dispersed in a solvent. An acrylic resin, vinyl chloride resin, urethane resin or the like may be used in place of the polyester resin.

A process for producing the resin window 1 is explained below. First of all, a process for producing the insert film 3 is explained according to FIGS. 4A to 4C.

Figure 4A:
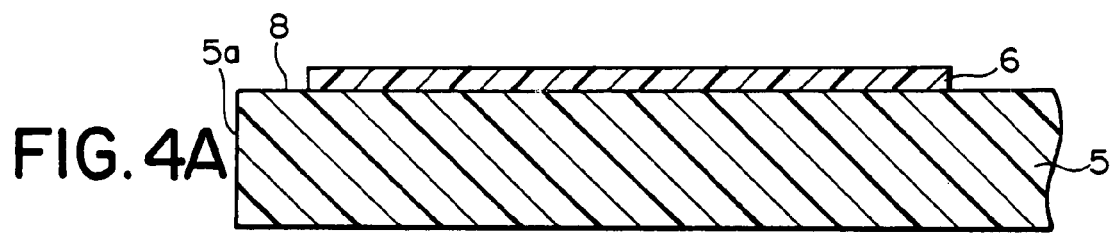
FIGS. 4A to 4C are partial sectional views showing a process for producing an insert film in order of steps.
Figure 4B:
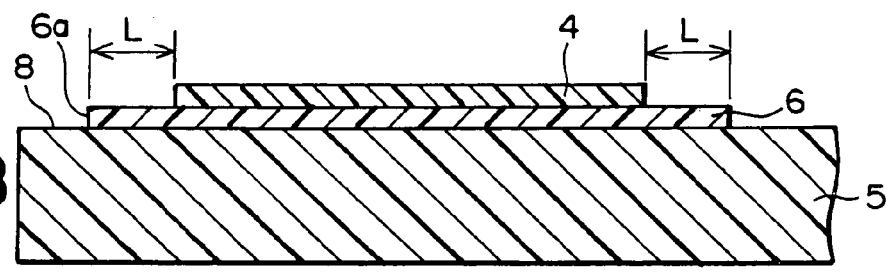
Figure 4C:
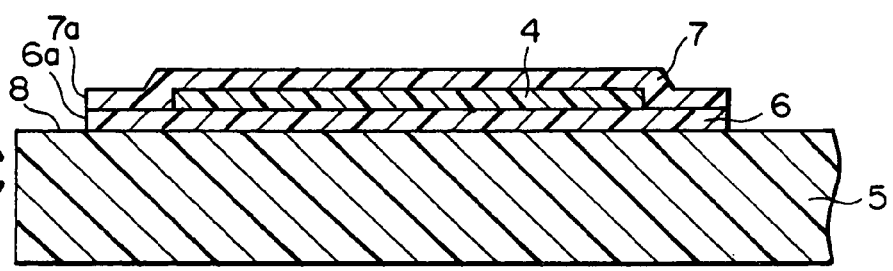

The insert film 3 is formed by successively printing the first binder layer 6, the printed part 4 and the second binder layer 7 on one surface of the resin film 5, on the other surface of which having been subjected to a hard coat treatment, by a screen printing or the like. The resin film 5 to which a hard coat treatment has been subjected is set to a screen printing machine such that the surface opposite the hard coat treated surface faces the screen, and the first binder layer 6 is printed on the predetermined position as shown in FIG. 4A. The first binder layer 6 is formed in a state such that the area 8 is formed between an outer periphery 6a of the first binder layer 6 and a periphery 5a of the resin film 5. After the first binder layer 6 has dried, the printed part 4 is printed on the first binder layer 6 as shown in FIG. 4B. The printed part 4 is set such that a distance L between the edge thereof and the edge of the first binder layer 6 is at least 0.2 mm. After an ink has dried, the second binder layer 7 is printed so as to cover the printed part 4. The second binder layer 7 is printed in a state such that the periphery 7a thereof overlaps with the periphery 6a of the first binder layer 6 as shown in FIG. 4C. When the second binder layer 7 has dried, the production of the insert film 3 is completed.

The insert film 3 is then fixed on the predetermined position in a fixed mold of an injection molding mold, such that the surface having the printed part 4 formed thereon faces a movable mold. After closing the movable mold, a molten resin (polycarbonate) is injected in a cavity from a gate. The injected polycarbonate fills the cavity in a state of covering the surface of the printed part 4 side of the insert film 3 set in the mold, and the insert film 3 is integrally molded on the surface of the panel body 2 as shown in FIG. 1. After cooling the mold, a molded product is taken out of the mold. Burrs are removed and the resin window 1 is completed.

In conducting the insert molding, the gate for injecting the molten resin in the cavity of the mold is arranged at one edge side of the molded product. Therefore, the vicinity of the printed part 4 near the gate receives a large shear force from the molten resin that has high temperature and high pressure. Because the cavity side of the printed part 4 is covered with the second binder layer 7, the molten resin is not directly in contact with the printed part 4, and the printed part 4 is suppressed to receive a large shear force. As a result, the surface of the printed part 4 is not shaven, and an ink flow due to an ink shaving is prevented. However, since the printed part 4 is arranged with a wide solid coating along the periphery of the insert film 3. However, the width of the part of the second binder layer 7 which is directly adhered to the first layer 6 outside of the printed part 4 is narrow.

Thus, if the first binder layer 6 is not present as in the conventional technique, when the second binder layer 7 receives a large shear force from the molten resin during an injection molding, there is the possibility that a part of the second binder 7 peels off, an ink having a poor adhesiveness with the resin film 5 lifts from the resin film 5, and an ink flow occurs. However, according to the present invention, because the first binder layer 6 is present between the printed part 4 and the resin film 5, and also the printed part 4 is sealed with the first and second binder layers 6 and 7, the printed part 4 is prevented from lifting from the resin film 5 and, as a result an ink flow is surely prevented.

Due to the area 8 being formed between the peripheries 6a and 7a of the first binder layer 6 and the second binder layer 7 and the periphery of the resin film 5, the peripheral portion of the resin film 5 is integrally molded with the panel body 2 in a direct contact state through the area 8. The adhesiveness between the resin film 5 and the panel body 2 is superior than the adhesiveness between the first binder layer 6 and the resin film 5 or between the second binder layer 7 and the panel body 2. Therefore, as compared with the case that the peripheral portion of the resin film 5 is integrally molded with the panel body 2 through the first and second binder layers 6 and 7, the peripheral portion of the resin film 5 is maintained in a state of closely adhering to the panel body 2.

The resin window 1 constituted as above is used when mounted to a window of automobiles. The resin window 1 is adhered to a car body panel with an adhesive, and the printed part 4 plays a role of hiding a fixed portion of the resin window 1, and shielding the adhesive from sunlight, thereby suppressing deterioration of the adhesive. In the case that the first binder layer 6 is not present, even if a molding is successfully conducted, a gap tends to generate between the printed part 4 and the resin film 5 with the passage of time during use. However, due to the presence of the first binder layer 6, adhesiveness of the printed part 4 to the resin film 5 is improved and this prevents formation of a gap between the printed part 4 and the resin film 5 with the passage of time.

This embodiment has the following effects.

(1) The printed part 4 is printed on the first binder layer 6 formed on the resin film 5, and also sealed with the first binder layer 6 and the second binder layer 7 formed on the printed part 4. Therefore, when the insert film 3 is arranged in a mold and a molten resin is injected in the mold, a good adhesiveness between the printed part 4 and the resin film 5 is secured by the first binder layer 6, and the printed part 4 is protected by the second binder 7. As a result, an ink flow is prevented from occurring. Further, due to the presence of the first binder layer 6, a gap can be prevented from being generated between the printed part 4 and the resin film 5 with the passage of time after the completion of a molded product.

(2) The printed part 4 is formed as a trimming portion along the peripheral portion of the resin film 5. Because the area 8 is formed between the peripheries 6a and 7a of the first binder layer 6 and the second binder layer 7 and the periphery 5a of the resin film 5, the peripheral portion of the resin film 5 is integrally molded with the panel body 2 in a state of being directly in contact with the panel body 2. Therefore, due to the presence of the printed part 4 formed as a trimming portion along the peripheral potion of the resin film 5, the peripheral portion of the insert film 3 that is liable to peel off the panel body 2 is maintained in a state of closely adhering to the panel body 2.

(3) The panel body 2 and the resin film 5 are both made of the same material, and the first binder layer 6 and the second binder layer 7 are made of the same material. Therefore, as compared with the case that the panel body 2 and the resin film 5 are made of different material, the adhesiveness at the interface thereof is improved, and by using the binder layers made of the same material a good adhesiveness of the printed part 4 to the panel body 2 and the resin film 5 can be secured.

(4) Polycarbonate is used as a material of the panel body 2 and the resin film 5. Therefore, a material conventionally used as a resin window of automobiles can be used as it is, and function that is necessary as the resin window 1 can be secured.

(5) The insert film 3 can easily be produced by successively forming the first binder layer 6, the printed part 4 and the second binder layer 7 on the predetermined position of the resin film 5.

(6) The printed part 4 and the two binder layers 6 and 7 are formed on the resin film 5 by a screen printing. Therefore, the printed part 4 and the two binder layers 6 and 7 can be formed on the predetermined position of the resin film 5 with good accuracy.

The embodiment is not limited to the above one, and for example, the following modifications and changes can be made.

Figure 5A:
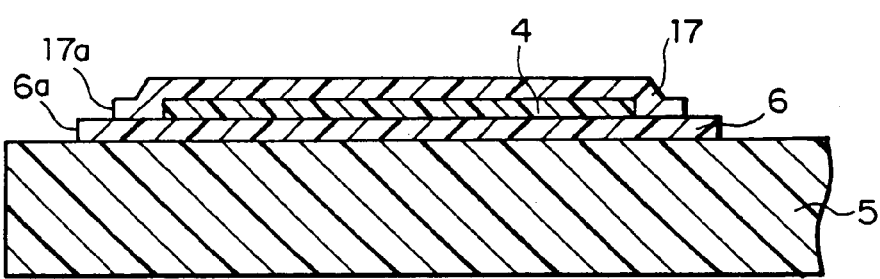
FIGS. 5A and 5B are partial sectional views of insert films according to modifications of the embodiment of the present invention.
Figure 5B:
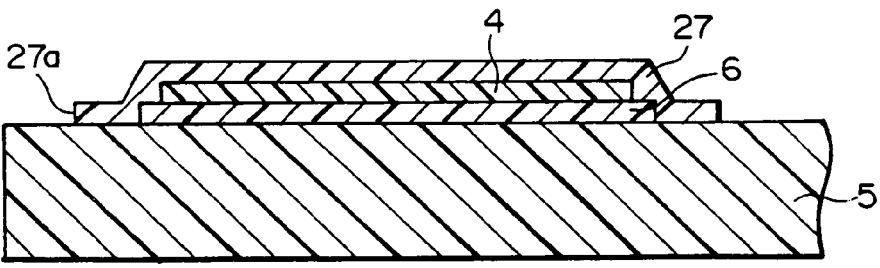
Figure 6:
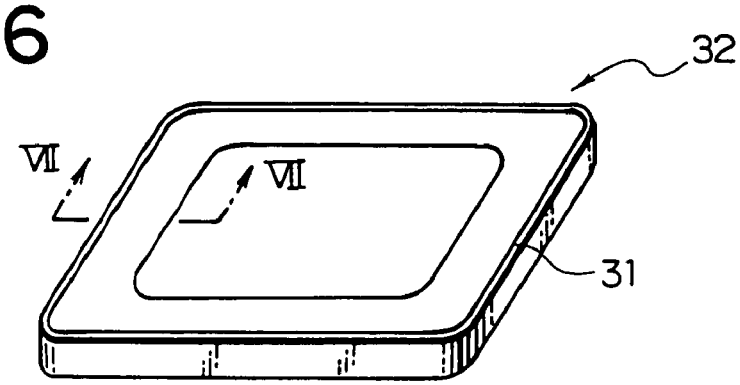
FIG. 6 is a perspective view showing a conventional resin window.
Figure 7:
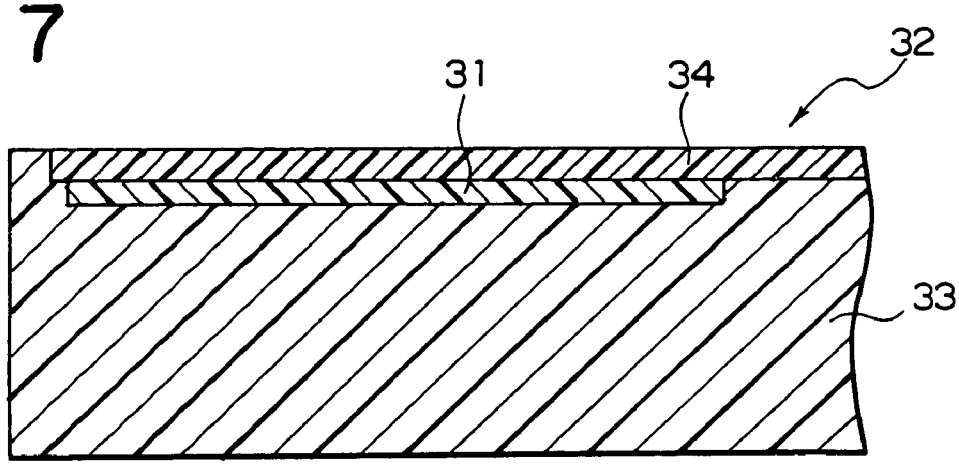
FIG. 7 is a partial sectional view taken along the line VII—VII in FIG. 6.
Figure 8:
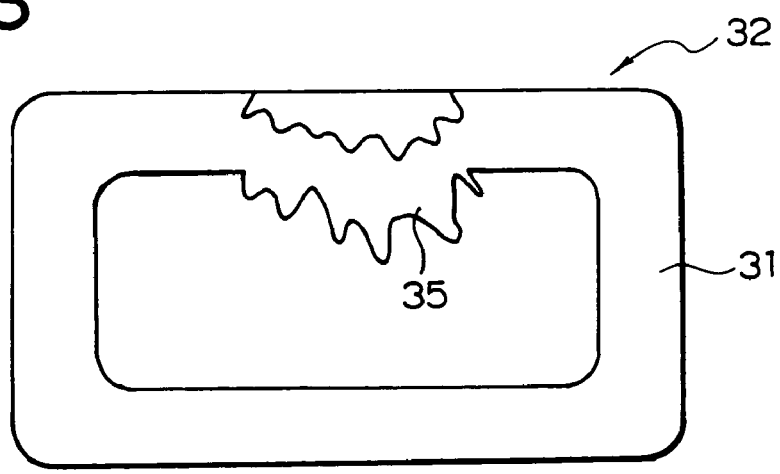
FIG. 8 is a plan view of a resin window illustrating a state where an ink flow occurs.

The two binder layers 6 and 7 are not limited to the structure of being formed in a state such that those peripheries coincide, but it is sufficient if only the printed part 4 is sealed with both two binder layers 6 and 7. For example, the two binder layers 6 and 7 may be formed by laminating such that the periphery 17a of the second binder layer 17 is located inside the periphery 6a of the first binder layer 6 as shown in FIG. 5A, or by completely covering the first binder layer 6 with the second binder layer 27 so that the peripheral portion 27a of the second binder 27 closely adheres to the resin film 5.

The two binder layers 6 and 7 may be formed such that the outer periphery of at least one of the binder layers coincides with the periphery of the resin film 5. In other words, an area may not be present between the peripheries of the binder layers and the periphery of the resin film 5.

The first binder layer 6 and the second binder layer 7 need not always be made of the same material. The two binder layers may be made of different material if the first binder layer 6 has a good adhesiveness with the printed part 4 and the resin film 5, and the second binder layer has a good adhesiveness with the printed part 4 and the panel body 2. However, since the same material is generally used for the panel body 2 and the resin film 5, the use of the same material for the two binder layers 6 and 7 makes it easy to secure a good adhesiveness at the interface of the two binder layers 6 and 7, and a good adhesiveness of each binder layer with the panel body 2 or the resin film 5.

The printed part 4 is not limited to a blackout formed at the peripheral portion of the resin window 1, but a pattern as a sunshade, a conductive linear pattern such as anti-fogging and ice-melting heat wires or antennas for a car radio or a decorative pattern may be provided.

The printed part 4 and both binder layers 6 and 7 may be formed by a method other than a screen printing.

The resin window 1 is not limited to use for automobiles, but may be applied to a resin window for windows of buildings, or a resin panel such as for partitioning or decorative panel and the like.

In the case that the resin window is applied to a resin panel other than the resin window 1 for automobiles, a blackout may be omitted as the printed part 4.

The resin film 5 used in the above embodiments does not limit its thickness, and generally includes a sheet than is considered to be thicker than a film.

In the case that the resin panel is applied to a resin window for automobiles, it is not limited to the structure in which the resin panel is directly secured to a car body panel. Instead, the resin panel may be secured to the car body panel through the intermediary of a frame for reinforcement. In the case that the resin panel is secured to the frame with an adhesive, a blackout should be positioned so as to hide the adhered portion.

What is claimed is:

1. A resin panel comprising:
   a resin panel body; and
   a film for insert molding used fixed in an injection molding mold arranged on a surface of said resin panel body, said film comprising:
   a resin film;
   a first binder layer formed on the surface of the resin film;
   a printed part formed on the first binder layer; and
   a second binder layer formed to seal said printed part in co-operation with the first binder layer, wherein the second binder layer directly contacts both the printed part, along a surface of the printed part which faces said resin panel body, and the first binder layer, along a periphery of the printed part, wherein the first binder layer, printed part and second binder layer are formed in this order;
   wherein the periphery of the resin film extends beyond the periphery of the first binder layer such that the entire surface of the first binder layer which faces the resin film directly contacts the resin film; and
   wherein said resin panel body is integrally molded with said film by an insert molding so that a surface of the resin film of said film, at the side on which a printed part is formed, faces an inside of the resin panel, wherein the printed part directly adheres to the first binder layer and to the second binder layer, and wherein the entire printed part consists entirely of ink.

2. The resin panel according to claim 1, wherein said resin panel body is directly adhered to said resin film at an outer side of the periphery of the first binder layer.

3. The resin panel according to claim 1, wherein said second binder layer covers the periphery of the first binder layer to directly adhere to said resin film; and
   wherein said resin panel body directly adheres to said resin film on an outer side of the periphery of said second binder layer.

4. The resin panel according to claim 1, wherein said resin panel is a window for automobiles.

5. The resin panel according to claim 1, wherein a material of said resin panel body is the same as that of said resin film.

6. The resin panel according to claim 5, wherein a material of said resin panel body and said resin film is polycarbonate.

7. The resin panel according to claim 1, wherein the periphery of the second layer is printed to overlap the periphery of the first layer.

8. The resin panel according to claim 1, wherein the printed part is coated along the periphery of the insert film.

9. The resin panel according to claim 1, wherein the printed part is one or a combination of more than one selected from the group comprising:
   a blackout;
   a pattern as a sunshade;
   a conductive linear pattern of anti-fogging heat wires;
   a conductive linear pattern of ice-melting heat wires;
   a conductive linear pattern of antennas for a radio; and
   a decorative pattern.

* * * * *